United States Patent [19]

Soldavini

[11] 4,399,647
[45] Aug. 23, 1983

[54] MOTORIZED LAWN-MOWER, PROVIDED WITH A RIGID CUT GRASS COLLECTING VESSEL, INCLUDING A REMOVABLE BAG

[76] Inventor: Teodoro Soldavini, Via Leonardo da Vinci, 20062-Cassano D'Adda, (Milano), Italy

[21] Appl. No.: 289,052

[22] Filed: Jul. 31, 1981

[30] Foreign Application Priority Data

Aug. 12, 1980 [IT] Italy .............................. 24117 A/80

[51] Int. Cl.³ ............................................ A01D 35/22
[52] U.S. Cl. ..................................................... 56/202
[58] Field of Search ................. 220/404, 334; 56/202

[56] References Cited

U.S. PATENT DOCUMENTS

| | | | |
|---|---|---|---|
| 2,202,238 | 5/1940 | Thompson | 220/404 |
| 3,757,503 | 9/1973 | Soldavini | 56/202 |
| 3,777,461 | 12/1973 | Giraud | 56/202 |
| 3,805,499 | 4/1974 | Woelffer et al. | 56/202 |
| 3,822,536 | 7/1974 | Leader | 56/202 |
| 3,962,852 | 6/1976 | Boyer | 56/202 |
| 4,203,276 | 5/1980 | Plamper | 56/202 |
| 4,238,918 | 12/1980 | Saruhashi et al. | 56/202 |

Primary Examiner—Robert A. Hafer
Attorney, Agent, or Firm—Bucknam and Archer

[57] ABSTRACT

The present invention relates to a motorized lawn-mower, provided with a rigid cut grass collecting vessel, including a removable bag.

The lawn-mower comprises a discharging duct thereto there is coupled the collecting vessel, as provided with a grid member for the outflow of the cut grass conveying air stream, by means of double-hinge members.

To a wing portion of these latter there is articulated the grid member which is thus effective to be removed and moved away from the vessel.

Thus in the vessel a bag may be fitted, being made of a plastics or flexible material, and the top edge or rim portion thereof is turned over on the mouth of the vessel.

The cut grass, upon discharging from the lawn-mower, is able of being collected by the bag, which can be easily closed and removed from the vessel.

1 Claim, 8 Drawing Figures

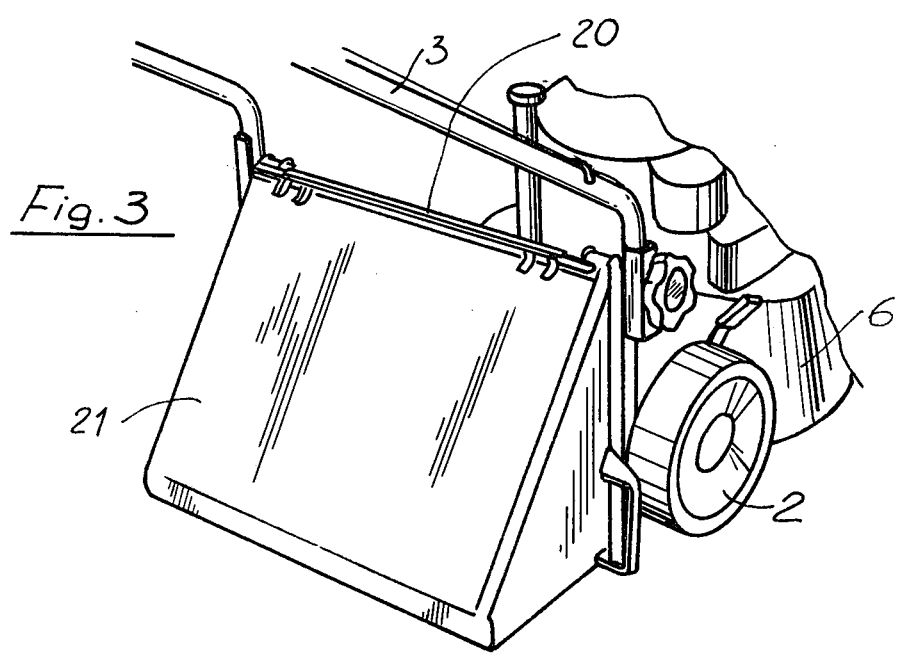
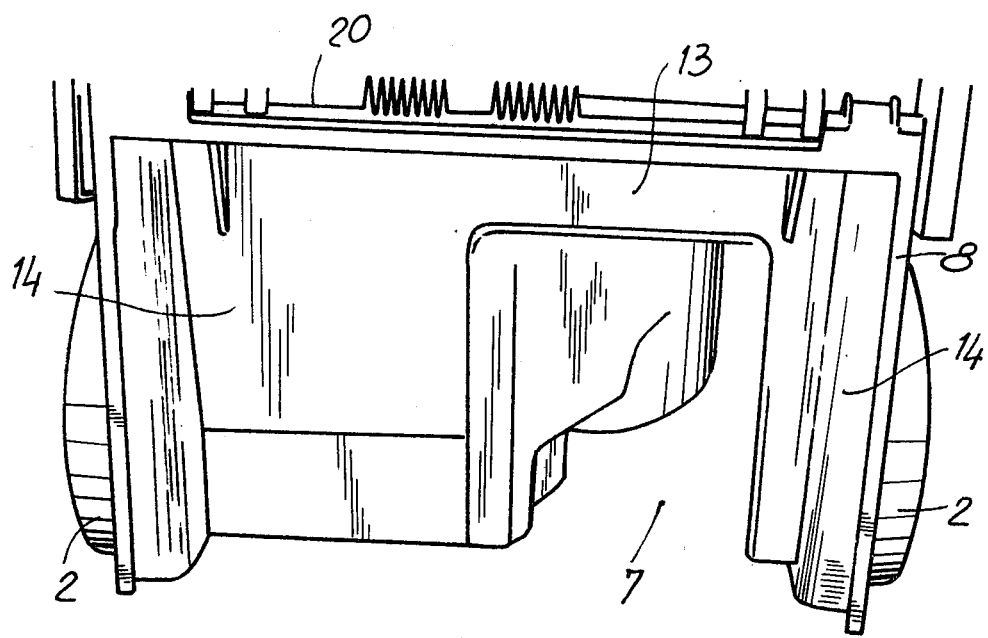

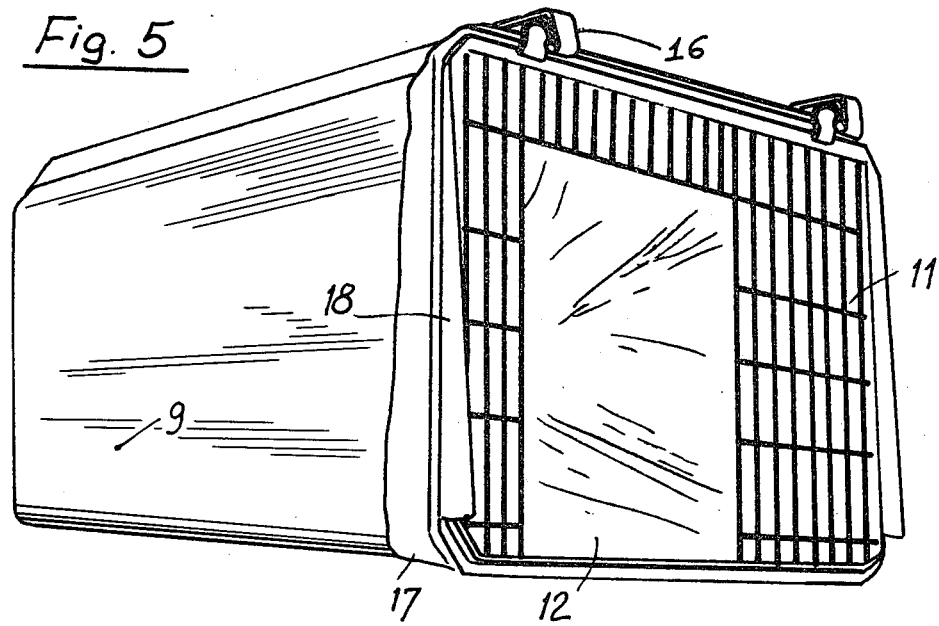
Fig. 5
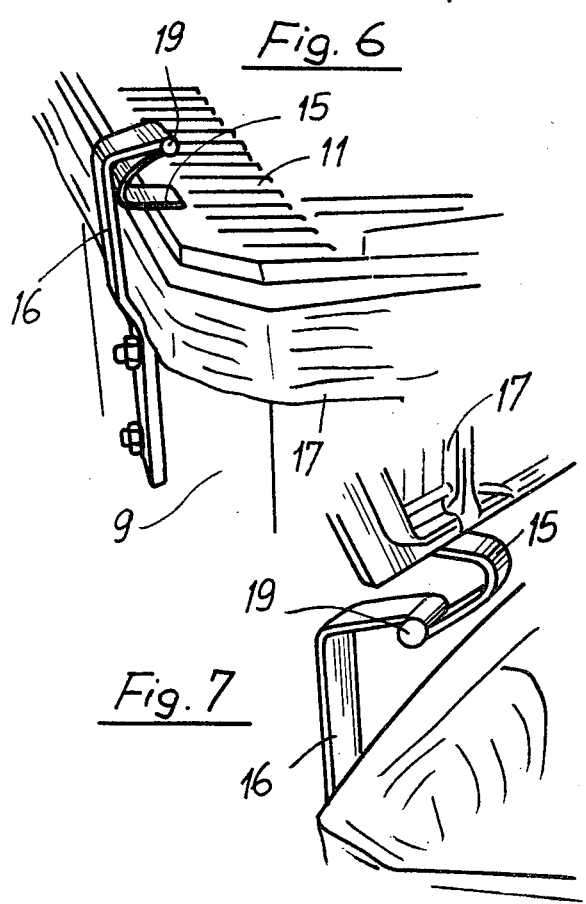
Fig. 6
Fig. 7
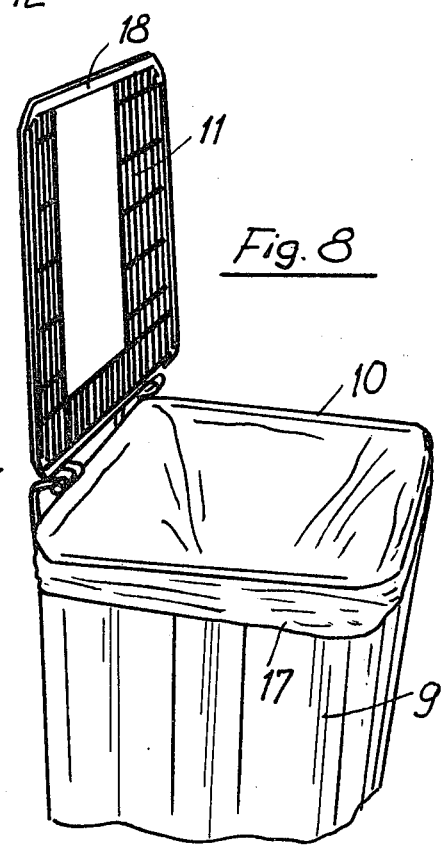
Fig. 8

MOTORIZED LAWN-MOWER, PROVIDED WITH A RIGID CUT GRASS COLLECTING VESSEL, INCLUDING A REMOVABLE BAG

BACKGROUND OF THE INVENTION

As it is known for the maintenance jobs or the grass surfaces of gardens and the like suitable machines are used which are generally called "lawn-mowers".

These machines, which operates near the ground in such a way as to cut grass at a small height therefrom, are provided with a shaped shell, or casing, encompassing a rotating assembly, of substantially disk shape and provided with blades, and directly or indirectly driven by a suitable motor, of the inner combustion or electric type.

From said rotating assembly there extends a discharging duct spirally encompassing said casing periphery and tangentially extending therefrom to lead to the outside.

The grass, in fact, is conveyed through said discharging duct by the air stream as generated by the rotation of said blade assembly, acting as the impeller of a centrifugal blower.

On the other hand, the cut grass has to be removed from the ground, since it would prevent a suitable aeration with a consequent decreasing of the growing characteristics thereof.

Due to this reason the lawn-mowers are preferably provided with a vessel, locaed at the discharging opening thereof, to collect therein the cut grass.

Said vessel is generally formed by a rigid basket effective to be coupled to the shell or casing of the lawn-mower, to be carried along thereby.

On the other hand, the conventional baskets, upon removing from the latching members thereof, are to be emptied and the contents thereof is to be discharged at a desired position by means of a turning over operation.

Accordingly the grass can be collected at the most convenient positions, but successively it has to be collected again for transporting away from the grass surface.

SUMMARY OF THE INVENTION

The aforesaid practical drawback is eliminated by the motorized lawn-mower, provided with a suitable rigid vessel, either due to the charactristics of the material forming said vessel or due to the provision of a frame effective to support the material forming the walls of said vessel effective to collect the cut grass, according to the present invention.

In fact the subject vessel comprises cantilever latching means effective to allow for a plastics material or flexible material bag to be fitted in the inside of said vessel, by suitably anchoring the top of said bag on said vessel top edge.

Accordingly, as the aforesaid bag has been filled with cut grass, it may be closed, upon having removed the top whereof from the vessel mouth, and easily removed.

Owing to this solution, the cut grass is practically left on the grass surface or outside therefrom in an already packaged condition, and thus ready to be quickly removed.

More specifically the motorized lawn-mower according to the invention comprises a substantially rigid vessel for collecting the cut grass as conveyed suspended in an air stream.

Said vessel is completely closed, with the exception of a vertical side whereof, in particular a head portion whereof, the contour of whiich is effective to define the maximum cross-section of its inside space and greatly exceeds, at least in width and preferably also in height, the outlet cross-section of the duct therethrough the grass is conveyed as suspended in the air stream.

The head portion of that same vessel, as this latter is in its operative condition, is facing said duct, in such a way as to broadly encompass the mouth thereof.

Furthermore, between the vessel head portion and the corresponding head portion of the lawn mower there is interposed a grid member, or an air permeable means, hardly to be traversed by the grass.

Said grid member is so located as to occupy the portions encompassed by the head of the vessel, but outside of those of the duct mouth, in such a way that the cut grass can be projected into said vessel, while air is discharged to the outside, through said grid, in a direction which is essentially opposite to the inlet direction.

Furthermore in front of said grid, and outside therefrom, there are provided means, in particular but not necessarily associated to the casing, or shaped shell or said lawn-mower, to downwardly deflect, at the duct mouth sides, the air stream flowing through the openings of said grid.

This latter is povited to the vessel by means of shaped hinges, as cantilever-wise mounted on a wall of said vessel.

Owing to this approach, the vessel edge or mouth is a free one and accordingly it is able of receiving the turned over top rim or edge of a plastics material bag as inserted into said vessel for collecting the cut grass.

BRIEF DESCRIPTION OF THE DRAWINGS

These and other characteristics, of constructional and functional nature, of the motorized lawn-mower, according to the present invention, will become more apparent from the figures of the accompanying drawings, relating to a preferred though not exclusive embodiment of said lawn-mower and where:

FIG. 3 is a perspective view illustrating that same lawn-mower free of said vessel;

FIG. 4 is a front view illustrating the mouth of the cut-grass conveying air stream discharging duct, as encompassed by evacuated air-flow deflecting means;

FIG. 5 illustrates that same vessel from the opening side thereof, as coupled to the grid member encompassing the mouth of said discharging duct;

FIG. 6 illustrates the procedure for latching the grid to the vessel;

FIG. 7 is a partial view illustrating that same vessel, the grid thereof being upwardly turned over; and FIG. 8 is another perspective view illustrating the vessel with the grid upwardly turned over.

DESCRIPTION OF THE PREFERRED EMBODIMENT

Figure 1:
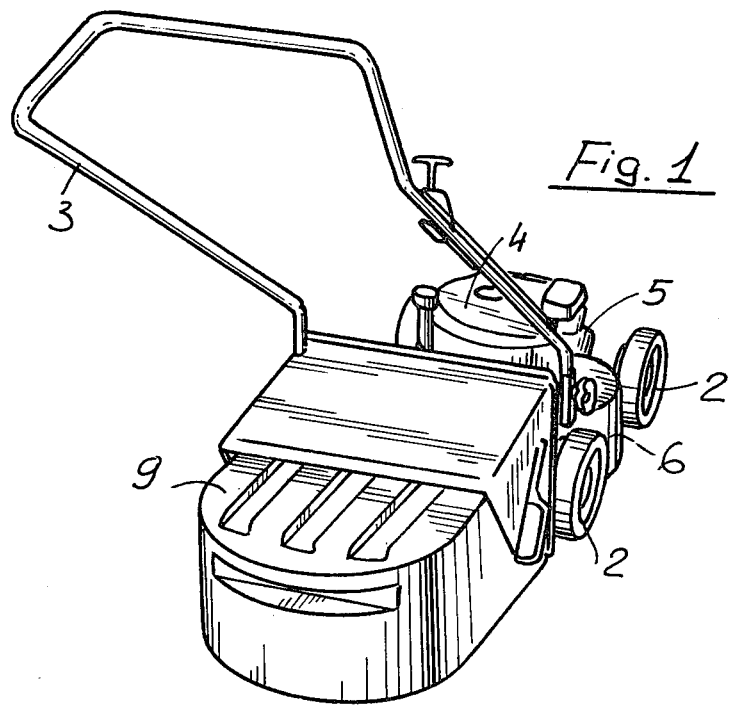
FIG. 1 is a schematic perspective rear view of the lawn-mower according to the invention.

With particular reference to the numbers of the several figures of the accompanying drawings, the motorized lawn-mower according to the present invention comprises, according to a known constructional approach, a structure (1), mainly formed by the same shaped shell, or casing, of the cutting rotating assembly (not shown), provided with suitable bearing wheels (2), and associated to a handle bar (3) for driving and guiding the machine.

The rotating assembly is driven, for example, by a small engine (4), the position thereof can be any, (for example in the case of directly driven lawn-mowers) and the rotation thereof, in addition to carry out the cutting of grass, on the underlying ground, is effective to generate an air stream or flow.

This air flow is directed into a scroll (5), formed by said casing (or structurally separated) and ending with an outlet tangential duct (6), the mouth (7) thereof opens at the rear head vertical portion (8) of said structure (1).

Said vessel, or basket, (9), for collecting the cut grass, is located and supported in such a way as to positioned, as the machine is in its operative condition, in front of said head portion (8) and on the extension on the duct (6).

Said vessel, which is made of a metal or preferably plastics material, or other suitble material, is completely closed at the walls thereof (side, rear, upper and lower walls), but completely open at the front face thereof (10), located in front or the aforesaid head portion (8).

To that same vessel (9) there is coupled a perforated disphragm, more specifically a grid, (11), effective to be upwardly turned over, said grid being open at the portion (12) thereof encompassing the mouth (7) of the duct (6) and occupying, accordingly, only that portion of the area encompassed by the open head (10), but encompassing said mouth (7).

The casing head (8) is furthermore provided, at the portions thereof encompassing said mouth, with transversal and vertical recesses (14), downwardly open and effective to deflect to the ground the air flow which backflows through said grid (11).

This latter is pivoted to the vessel (9) by means of bent hook members (15), in turn pivoted to corresponding angled brackets (16), as cantilever-wise fixed (FIG. 6) on the wall of said vessel, in such a way as to leave free a peripherical portion thereof.

Owing to this approach it is possible to engage the turned over top portion or edge (17) of a generic plastics material bag, effective to package the cut grass, with the mouth of the vessel, by means of a simple manual operation.

The structure of said grid (11), moreover, projects with respect to a continuous perimetrical frame (18), in such a way as to be able of inserting between the walls of said vessel, by rotating about the pivoting axes (19) whereof.

Figure 2:
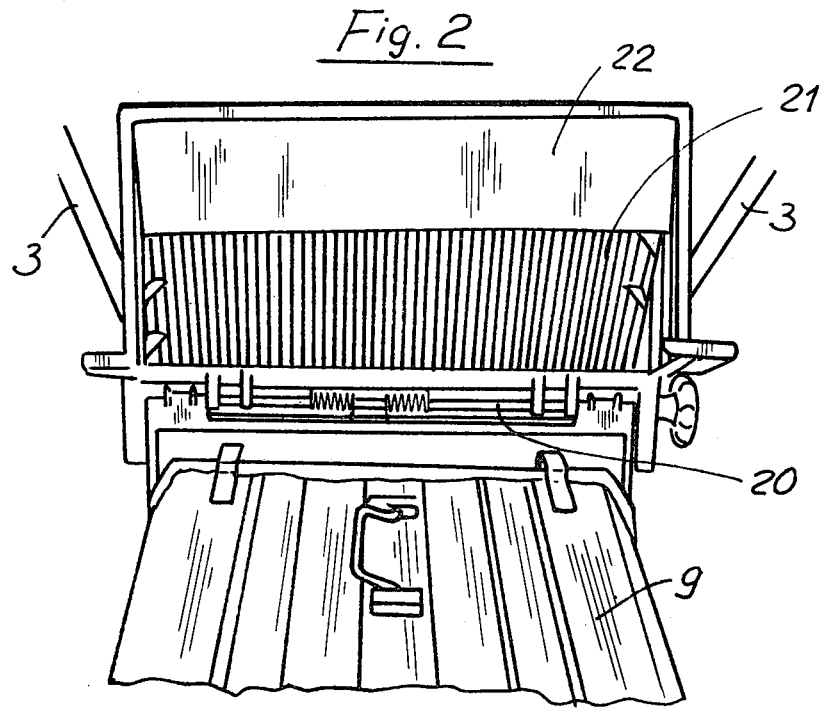
FIG. 2 illustrates the vessel in the latching position thereof to the casing or shell of that same lawn-mower.

Said rotation, in particular, brings the bent hook members (15) to lay with the concave portion thereof facing downwardly (FIGS. 2 and 5), thereby said hook members are effective to engage from the top on a bar or rod member (20), carried by the rear head portion of said casing To said bar or rod member (20), furthermore, there is pivoted a substantially triangular prismatic structure (21), open at the bottom and toward said rear head of the casing and provided with side handles effective to facilitate the turning over of said structure, upwardly.

That same structure is provided, at the lower edge thereof, with a flap (22), made of a flexible material, effective to act as a rear holding member for the cut grass, as the lawn-mower is used without said vessel (9).

As this latter is used, on the other hand, said structure overlies (as it is shown in FIG. 1) said vessel.

The vessel, moreover, is provided, preferably at the portion thereof opposite to its open head portion, with a geometrically rounded configuration and with an upper handle.

From the above description and the observation of the several figures of the accompanying drawings, there are self-evident the great functionality and use facility characterizing the motorized lawn-mower according to the present invention.

Obviously, since the subject lawn-mower has been thereinabove described and illustrted only by way of an indicative and not limitative example, and only to demonstrate some application possibilities of the inventive concept, it should be pointed out that said lawn-mower can be realized and industrially producted by carrying out several different constructional solutions, without departing from the scope of the present invention.

I claim:

1. In a lawn mower having a cut grass collector box having an open end for receiving cut grass, a screen supported at said open end of the collector box and apertured to allow entry of cut grass into the collector box but to hold back cut grass accumulated in the collector box, the improvement which comprises hinge means connected to said collector box and to said screen, said hinge means being spaced apart from said collector box along a region thereof bordering the open end of the collector box to thereby allow the folding back along said region of the open edge portion of an opened grass collector bag inserted into the collector box, said hinge means being comprised of first and second members, one of said members being attached to said collector box, and the other said member being attached to said screen, said screen being disposed for insertion into the open end of the collector box to hold back therein said accumulated cut grass, said first and second members having hook-shaped portions allowing the collector box and screen to be hung together along a common support with one of said first and second members hooked shaped portion in underlying relation to the other.

* * * * *